United States Patent [19]

Urbanic et al.

[11] 3,944,781

[45] Mar. 16, 1976

[54] WELDING METHOD

[75] Inventors: John M. Urbanic, Pittsburgh;
Burney A. Major, Spring Church, both of Pa.

[73] Assignee: Aluminum Company of America, Pittsburgh, Pa.

[22] Filed: May 6, 1974

[21] Appl. No.: 467,160

[52] U.S. Cl. .............................. 219/137 R; 219/74
[51] Int. Cl.² ............................................ B23K 9/00
[58] Field of Search ......... 219/74, 118, 124, 137 R, 219/137 PS, 61

[56] References Cited
UNITED STATES PATENTS

| | | | |
|---|---|---|---|
| 2,504,868 | 4/1950 | Muller et al. | 219/74 X |
| 3,019,327 | 1/1962 | Engel | 219/124 X |
| 3,047,713 | 7/1962 | Liptak | 219/74 X |
| 3,325,626 | 6/1967 | Sargent | 219/74 X |

FOREIGN PATENTS OR APPLICATIONS

| | | |
|---|---|---|
| 659,015 | 11/1951 | United Kingdom |

OTHER PUBLICATIONS

Taylor Lyman, ed., *Metals Handbook*, Vol. 6, 1971, pp. 298, 299, 308, 309.

*Primary Examiner*—J. V. Truhe
*Assistant Examiner*—Clifford C. Shaw
*Attorney, Agent, or Firm*—Daniel A. Sullivan, Jr.

[57] ABSTRACT

A welding method including the steps of feeding a consumable electrode of at least ⅛-inch diameter at a constant speed toward a parent metal to be welded, while maintaining, with electrical power at an amperage-voltage characteristic having a slope of 0 to 2 amperes/volt, a direct current arc between the consumable electrode and parent metal, and while maintaining a shielding gas flow at the arc and on molten metal, wherein the electrical power is connected between the consumable electrode and the parent metal in reverse polarity, wherein the speed of the consumable electrode toward the parent metal to be welded is controlled within plus or minus ½% of the desired speed, and wherein the power source providing the electrical power has a dynamic regulated output current of plus or minus 5%.

11 Claims, 10 Drawing Figures

3,944,781

WELDING METHOD

BACKGROUND OF THE INVENTION

The present invention relates to a method of welding and more particularly to a method of welding thick aluminum plates together.

As will become evident to those skilled in the art, the present invention represents an improved MIG welding process.

SUMMARY OF THE INVENTION

It is an object of the present invention to provide a welding method capable of, in particular, providing high speed, high quality welding of thick aluminum plates together. Another object of the present invention is to make possible the obtaining of improved weld-metal deposition rates in the welding of thick aluminum plate by the use of large diameter consumable electrodes.

These as well as other objects which will become apparent in the discussion which follows are achieved, according to the present invention, by providing a welding method including the steps of feeding a consumable electrode of at least ⅛-inch diameter at a constant speed toward a parent metal to be welded, while maintaining, with electrical power at an amperage-voltage characteristic having a slope of 0 to 2 amperes/volt, a direct current arc between the consumable electrode and parent metal, and while maintaining a shielding gas flow at the arc and on molten metal, wherein the electrical power is connected between the consumable electrode and the parent metal in reverse polarity, wherein the speed of the consumable electrode toward the parent metal to be welded is controlled to within plus or minus ½% of the desired speed, and wherein the power source providing the electrical power has a dynamic regulated output current of plus or minus 5%.

BRIEF DESCRIPTION OF THE DRAWING

FIG. 1 is a perspective view of a welding operation according to the invention.

DESCRIPTION OF THE PREFERRED EMBODIMENTS

The welding method of the present invention is ideally suited for providing high speed, high quality welding of thick, for instance 1 to 3 inches thick, aluminum plate in two passes using large diameter, for instance at least ⅛-inch diameter and preferably ⅛- to ⅜-inch diameter, more preferably ⅛- to ¼-inch diameter, aluminum, consumable electrodes. Thicker plates can be welded by multipass techniques.

Figure 8A:
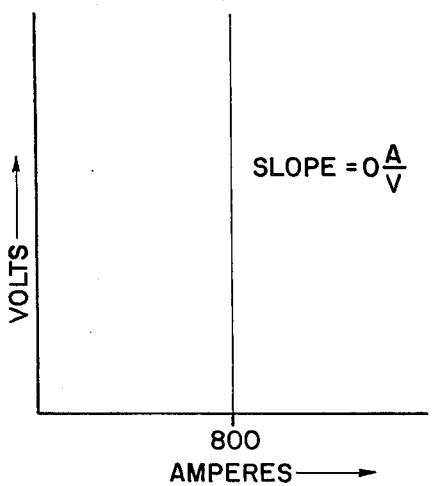
FIGS. 8a and 8b are graphs of voltage versus current.

To obtain consistent results with large diameter consumable electrodes, the combination of equipment used for the process of the present invention must provide sufficient ability to maintain stable conditions during welding. Welding arc current and consumable electrode feed rate are two controllable variables requiring primary consideration. Arc current fluctuations caused either by power source characteristics or poor commutation in the contact tube cause weld puddle fluctuations resulting in gross "puckering" of the weld bead surface. By utilizing a constant current power source, in conjunction with a welding torch which is capable of providing both reliable commutation of the welding current and adequate gas shielding, stable, controllable arcs up to 900 amperes or higher may be established. With "constant current source" as used herein, reference is, most preferably, to an amperage-voltage characteristic of the type shown in FIG. 8a, where the curve is a vertical, straight line, for instance intercepting the horizontal axis at 800 amperes. The slope of the straight line of FIG. 8a is, in terms of amperes per volt, equal to 0 amperes per volt (A/V).

Figure 8B:
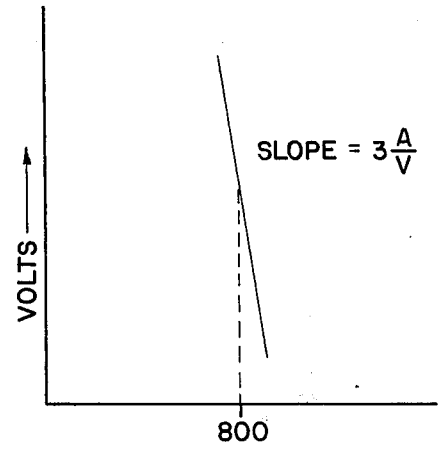

While an ampere-voltage characteristic of slope 0 amperes per volt is the most preferred characteristic for operation according to the present invention, operation may be at any slope between 0 and 5 amperes per volt, for example at the 3 amperes per volt characteristic illustrated in FIG. 8b. More preferably, the slope is from 0 to 2 amperes per volt.

Preferably, the power source for the present invention has a dynamic regulated output current of ±5%. More preferably, the regulation is to within ±1 %.

Suitable power sources capable of providing appropriately sloped characteristics for operation according to the present invention are, for instance, the Tek-Tran power source models TT–750 and LSC–1000 manufactured by the Tek-Tran Division of Air Products and Chemicals Corporation of Newark, Ohio, 43055; and Diametrics model 1741, serial No. 0001, manufactured by Diametrics Inc., of North Hollywood, Calif., 91605.

As regards consumable electrode feed rate, consistent, repeatable results are obtained by an electrode feed system capable of feeding the consumable electrode at a constant speed toward the parent metal being welded. Preferably, the electrode feed system maintains the electrode speed at a value within ± ½% of the particular value selected.

A third item requiring special attention is the welding torch. Sufficient contact area must be provided for reliable commutation of the high currents being utilized. Poor commutation will generate substantial variations in the arc length. In addition, there is needed an adequate sized gas cup, for providing proper shielding-gas coverage of the weld puddle being produced. With gas cups of, for example, 2-inch inner diameter, or 1⅜-inch diameter with an auxiliary trailing shield cup as described below with reference to the drawings, a typical cup-to-work distance of ½ inch was found to provide adequate coverage. In general, it is desired to make the cup-to-work distance as small as possible, without, however, causing the cup or shield to drag in the weld puddle. An auxiliary trailing shield cup is not a necessity; the primary cup, out of which the electrode issues, may be given a larger inner diameter to create the same effect.

The method of the invention is applicable to, for instance, the welding of thick castings, forgings, or extrusions although a preferred application is to the welding of thick aluminum plates.

No special consideration need be given to preparation of plates to be welded according to the present invention. The joint surface may be either saw cut of milled and may typically exhibit a surface finish ranging from 125 to 500 RMSS. Cleanliness is also not a critical factor; normally solvent wiping with any standard degreasing agent will suffice to remove any surface lubricants or contaminants which could cause weld porosity. In joint designs and metal thicknesses utilized with large diameter electrodes, for instance as described in the Examples below, it has been determined that a maximum gap between land surfaces of 0.030 inch can be consistently tolerated, in spite of it being preferred that no gap exist. Where gaps in excess of 0.030 inch occur, a removable backup may be used to prevent "burn-through."

Figure 1A:
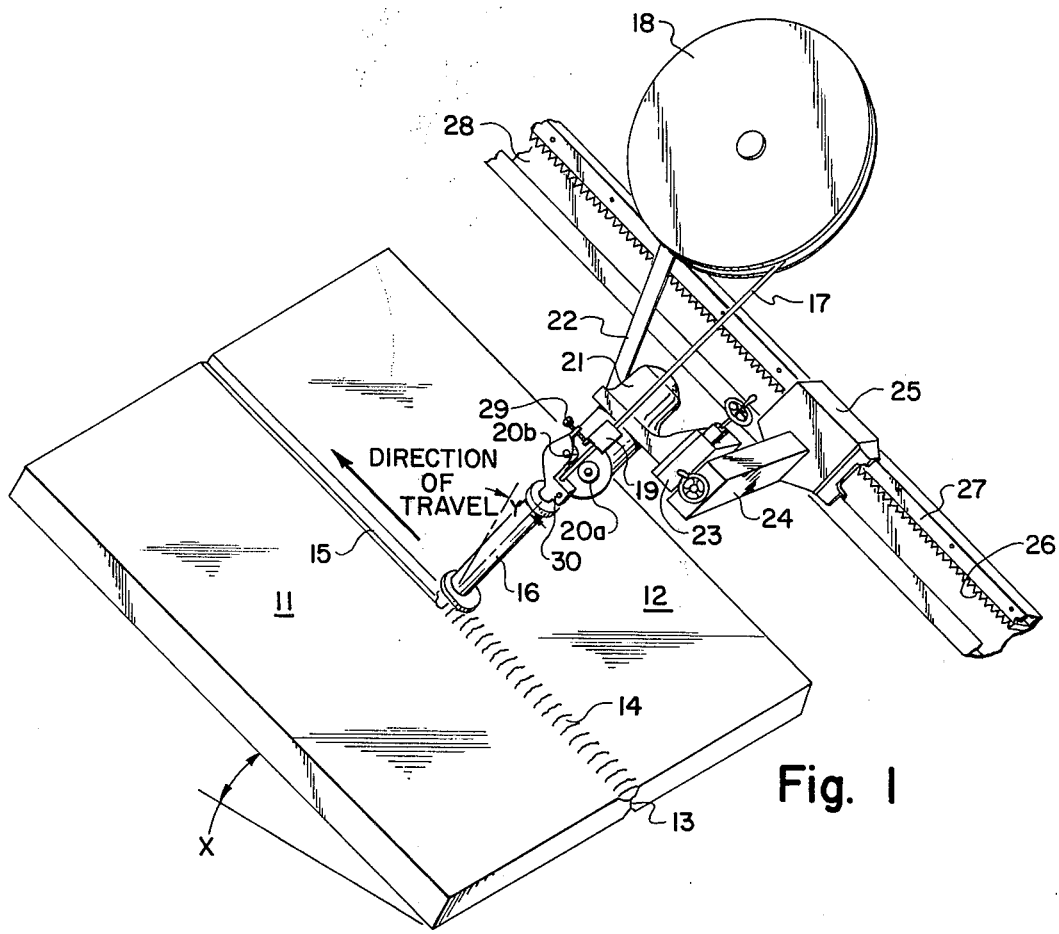
FIG. 1a is an end view of the abutment between the two plates to be welded in FIG. 1.
Figure 1A:
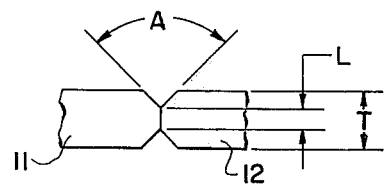

As a consequence of the size of the weld puddle generated with large diameter electrodes, the present invention provides, for the obtaining of uniform penetration, that there always be arc impingement onto the parent-metal from the electrode. This means that arc is always utlized for obtaining new melting of parent metal. Additionally, it assures that the arc remains stable. If the molten pool would move totally under the arc to prevent any of the arc from impinging on parent metal, then penetration would decrease and weld non-uniformity occur. Two methods may be used to prevent the puddle from moving to completely intercept the arc, thus not allowing it to impinge at all on parent metal. One method is to use a backhand (with respect to the perpendicular to the plates of FIG. 1) inclination angle on the torch, opposite to what is shown in FIG. 1. A disadvantageous effect of a backhand angle is that poor cleaning action occurs.

Figure 2:
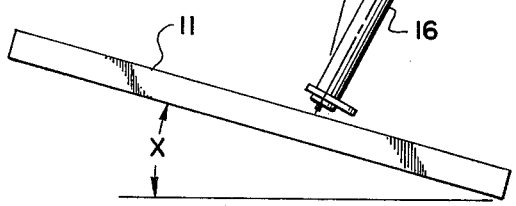
FIG. 2 is a side view of FIG. 1; angles X and Y lie in the plane of FIG. 2.

A second, preferred method providing better results is to incline the joint while using a forehand inclination angle, angle Y, on the torch, in the manner shown in FIGS. 1 and 2. Angles of joint inclination X of 3° to 12° from the horizontal position have been used. A 12° angle X produces excellent results for 2¾ inch thick plate and a 5° angle X is preferred for 2 inch thicknesses. This second method uses gravity to keep the weld puddle out of the way of the arc's always impinging on parent metal for the purpose of obtaining efficient melting of the same.

As used herein, the terms "forehand" and "backhand," with respect to the torch inclination, are defined with respect particularly to FIG. 2. With the 12 o'clock position being aligned with the perpendicular to plate 11, forehand positions are after noon, e.g., the position illustrated, while backhand positions are before noon.

Another consideration is the effect of seam tracking error. A deviation in excess of ±⅛-inch can produce mismatch in the penetration pattern, resulting in a lack of fusion at the center of the weld. Therefore, it is preferred that tracking be maintained within ±1/16-inch, i.e., that, as the torch moves along the weld joint between two plates, the center of the filler wire tip not move laterally from the plate abutment more than 1/16-inch on either side.

In the presently preferred practice of the invention, argon is utilized for cleaning and weld puddle protection. Helium is supplied in an amount adequate to obtain desired penetration and metal flow.

Attention to these process parameters as discussed above will allow those skilled in the art to operate the method of the present invention to consistently produce excellent quality weldments. No special precaution in joint preparation, fitup, post-weld treatment or backchipping has been found to be required. Specific joint designs of the type used for different plate thicknesses and electrode combinations will be discussed in the Examples below.

Referring now to FIG. 1, there is illustrated a process according to the present invention, in conjunction with equipment suitable for its execution. Two thick aluminum plates 11 and 12 are abutting against one another along abutment 13 and are in the process of being welded together. As illustrated, a single pass of weld bead 14 has thus far been deposited, this single weld bead completely filling groove 15.

The abutment between plates 11 and 12 is shown in further detail in FIG. 1a, the particulars of which will be discussed further in the Examples below.

The two plates are inclined from the horizontal an angle X, this being illustrated further in FIG. 2. Welding torch 16 is traveling upwards, along and parallel to groove 15, in the direction of travel as indicated in FIG. 1. The welding torch is inclined from the perpendicular to the plates an angle Y, this also being illustrated further in FIG. 2.

Consumable electrode 17, which is aluminum wire, is shown feeding off of electrode spool 18, down through a nylon inlet guide 19, then between drive roll 20a and idler roll 20b, and into the welding torch 16. The feeding of the electrode is caused by the drive roll 20a as the electrode passes between the rolls 20a and 20b.

Electrode spool 18 is provided with a drum onto which the consumable electrode is wound. Preferably, this drum should have a diameter of at least 15 inches, in order that the electrode not be given too great a "cast" or natural tendency to curl up. If the cast is too great, wire straightening rollers may be provided in the vicinity of the drive and idler rolls 20a and 20b.

Drive roll 20a is driven by feed motor 21.

Electrode spool mounting bracket 22 supports the electrode spool 18 relative to motor 21.

The entire unit of electrode spool, motor, drive rolls, and welding torch is adjustable vertically by the provision of vertical mounting block and slide 23, while the horizontal mounting block and slide 24 provides a corresponding horizontal adjusment ability.

The horizontal mounting block and slide 24 is connected rigidly to the carriage and motor unit 25 which co-acts with the gear teeth 26 of carriage rack 27 to provide the ability to move the welding torch exactly parallel to groove 15. Typical carriage speeds have been 4 to 10 inches per minute.

The carriage rack 27 is provided with mounting means 28 to allow it to be oriented precisely at the particular angle X to the horizontal chosen for the plates to be welded together.

The pressure existing between the idler and drive rolls on the one hand and the consumable electrode 17 on the other hand is capable of adjustment by electrode feed pressure adjustment 29.

The torch 16 is held relative to the electrode feed motor and idler and drive roll unit by torch mounting clamp 30.

Figure 3:
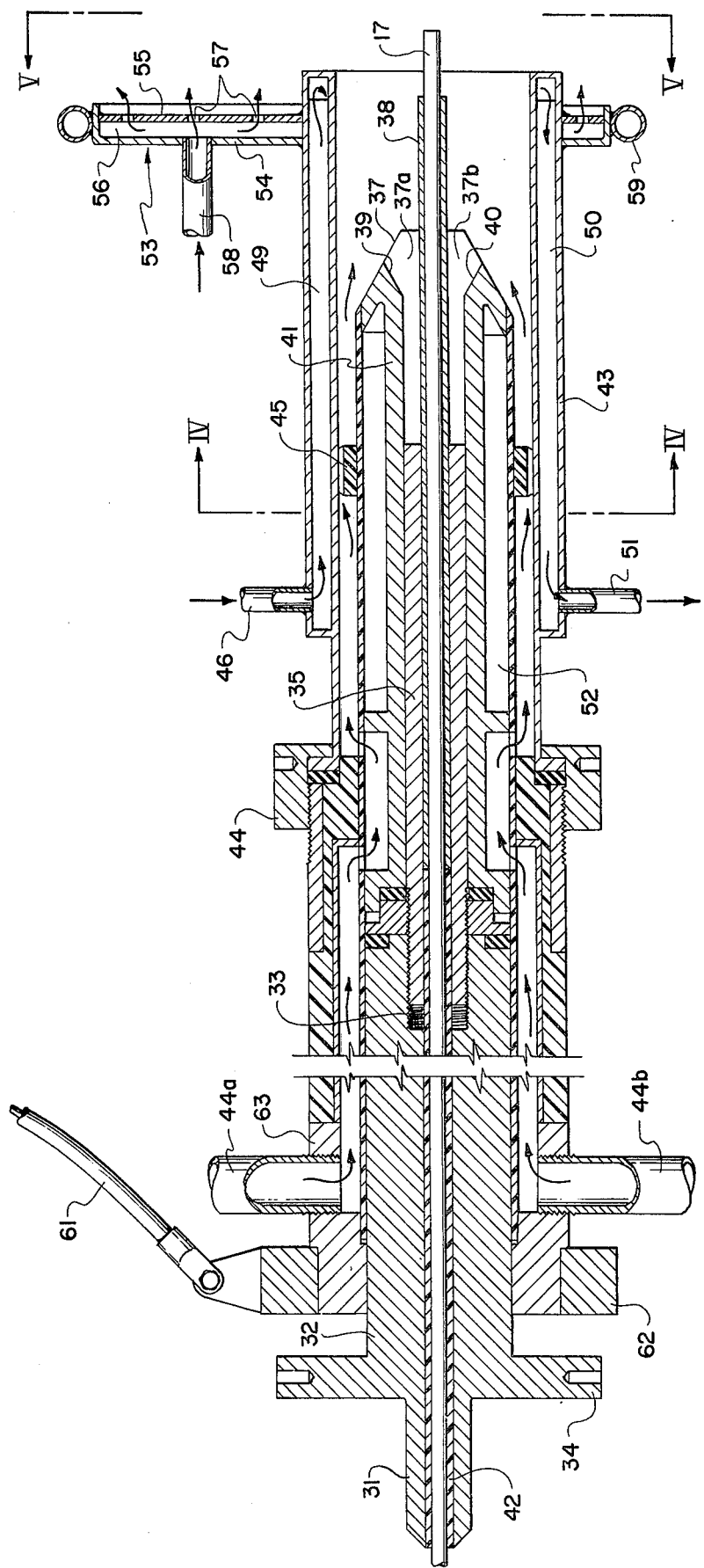
FIG. 3 is a detail cross section of the welding torch schematically illustrated in FIGS. 1 and 2, this cross section taken on the cutting plane III—III of FIG. 5.
Figure 5:
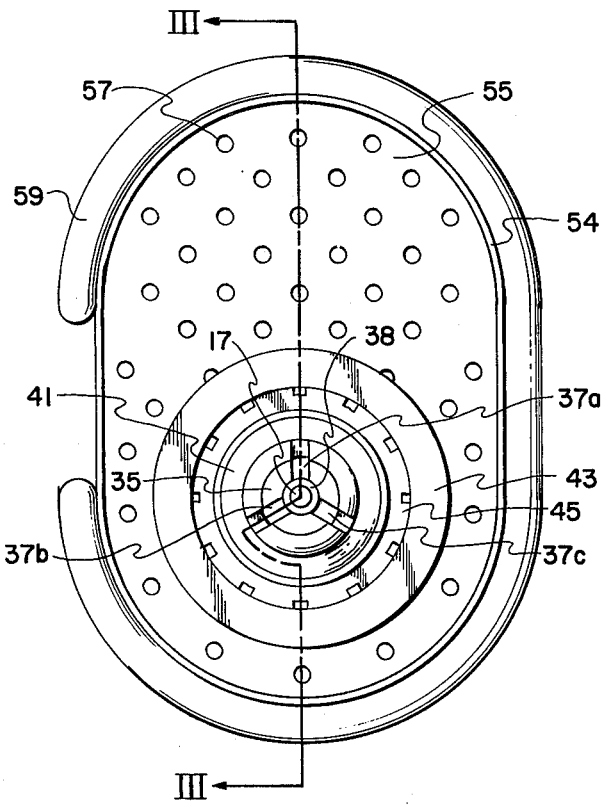
FIG. 5 is a view from plane V—V of FIG. 3.
Figure 4:
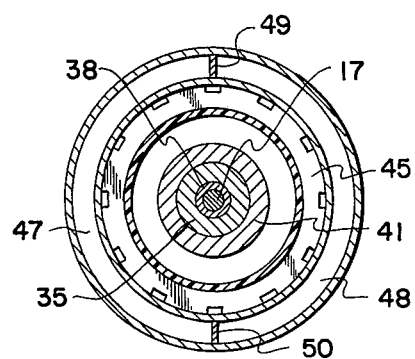
FIG. 4 is a cross sectional view taken on the cutting plane IV—IV of FIG. 3.

Referring now to FIGS. 3 to 5, a welding torch 16 suitable for practicing the present invention will now be described in detail. First with respect to FIG. 3, torch end mount 31 is the portion of the torch which is clamped by the torch mounting clamp 30. Torch end mount 31 is an integral projection on collet tightener 32, this being provided with internal threading 33, so that rotation of integral spanner flange 34 can axially shift collet 35 leftwards in FIG. 3 to cause the collet head 37, which is divided into three parts by slots 37a, 37b, and 37c (FIGS. 3 and 5), to be collapsed inwardly against the copper commutator tube 38 for the purpose of locking the same in place. The collet head 37 collapses inwardly due to the spring deflection which it undergoes caused by the interference of its outer conical surface 39 with the inner conical surface 40 of collet body 41.

A direct current, positive (in the case of reverse polarity) electrical connection is made, for example through lead 61, split clamp 62, shoulder piece 63, collet tightener 32, and collet 35, between an appropriate power source and commutator tube 38. Transfer of the electrical current between the commutator tube 38 and consumable electrode 17 must be very constant, and this is assured: (1) by providing a small clearance between the outer diameter of the consumable electrode and the inner diameter of the commutator tube, for example a clearance of 0.025 to 0.030 inches obtained by making the inner diameter of the commutator tube equal 0.280 inches for a 0.250 inch outer diameter on the consumable electrode or 0.150 inches for a 0.125 inch outer diameter consumable electrode; (2) by providing a relatively long length for the commutator tube, for example a length of 6 inches; and (3) by having a maximum cast in the consumable electrode, with the cast being limited only by the need to prevent undue friction between the outer surface of the consumable electrode and the inner surface of the commutator tube. A friction reducing nylon tube 42 extends from the inner end of the commutator tube 38 to the end of torch mount 31.

The cup 43 of the welding torch is attached to the remainder of the torch through the use of spanner nut 44 and serves the primary purpose of directing the flow of shielding gas down around the area being welded. The shielding gas flow is inwards through fittings 44a and 44b from a gas supply (not shown) and through the length of the torch, as shown by the arrows, to the location of the arc and weld puddle. Gas diffuser ring 45 serves the purpose of assuring that there is a uniform gas flow completely around the arc and puddle.

Due to the especially high current flows used in the present invention for large diameter consumable electrodes, water cooling is provided for the cup 43. The water enters the cup through fitting 46, flows downward through hemicylindrical chamber 47 formed by baffles 49 and 50, and then upwards through hemicylindrical chamber 48, to leave through fitting 51. Additional water cooling (details not shown) is provided in chamber 52 around the collet body 41.

In the particular embodiment of the welding torch as shown, additional gas shielding is provided for the purpose of protecting the relatively large weld metal puddle left behind as the welding torch moves in its direction of travel. This shielding is provided by trailing gas shield 53, which includes a saucer 54 mounted around cup 43, with a false bottom 55 forming a gas distribution chamber 56 and provided with holes 57 through which shielding gas is emitted for the purpose of shielding the weld puddle. The shielding gas enters the trailing gas shield through fitting 58 from a gas source (not shown). Provided around the perimeter of saucer 54 is a water cooling pipe 59.

Further illustrative of the present invention are the following Examples:

EXAMPLE I

Two 30-inch wide by 36-inch long plates of aluminum alloy 5083 in the O-condition and having a thickness T of 2-inches were prepared on their short edges to give a land dimension L of ⅝ of an inch and angle A of 75°. See FIG. 1a. The plates had been rolled, the direction of rolling being along their longer dimension. These plates were abutted together at the prepared edges and welded with direct current, reverse polarity using the process and apparatus details as illustrated in FIGS. 1 to 5. The power source was a Tek-Tran model TT-750 welding machine set to its characteristic of the type illustrated in FIG. 8a, where the slope of the characteristic is 0 amperes/volt. The electrode feeding motor and rolls were provided in the form of a Linde SEH-2 unit, which is manufactured by Union Carbide Corp., Linde Division, Cleveland, Ohio. The consumable electrode speed was held constant using the technique of attaching a Servotech Type AC 7135 A-2 tachometer (1 volt at 1,000 rpm, 0 to 10 volt output range) to the shaft of the electrode feed motor. This tachometer is manufactured by Servotech Products Company of Hawthorne, N.J. The output leads from the tachometer were connected to a Linde Type-C Electronic Governor, likewise manufactured by the Linde Division referred to above, and the output of this governor was in turn used for controlling the speed of the electrode feed motor. By this technique, it is possible to improve the speed regulation approximately to ±½% from the ±5% variation range obtained when using, instead of the tachometer output, electrode feed motor back-emf (electromotive force). The inner diameter of the cup 43 was 1⅜ inches, while the approximate dimensions of the trailing gas shield were 2¾ inches wide by 4¼ inches in length. Shielding gas flow through cup 43 was 150 cubic feet per hour of argon and 75 cubic feet per hour of helium, while the shielding gas flow through the trailing gas shield 53 was 150 cubic feet per hour of argon. The two plates were welded together using only two passes, one face pass and one root pass. Welding current for the face pass was 590 amperes, while the velocity of the consumable electrode toward the parent metal plates was 200 inches per minute. The consumable electrode was ⅛-inch diameter, type 5183 aluminum. The arc voltage for the face pass was 35 volts, and the welding torch moved at a constant speed, in its direction of travel as shown in FIG. 1, at 6 inches per minute. The welding current for the root pass was 610 amperes, with the consumable electrode moving toward the parent metal at a velocity of 206 inches per minute. The higher electrical current was used for the root pass, since burn-through was no longer of concern in view of the face pass already having been made; the higher current promotes the cancelling-out of distortion arising from the face pass. Again, arc voltage was 35 volts, with the torch being moved along the groove again at the speed of 6 inches per minute. In both the face and root passes, the plate inclination angle X, as shown in FIG. 2, was 5°. The torch inclination angle Y, also as shown in FIG. 2, was 10° to 15°. The root pass was made after the plates had cooled to 150°F. The resulting weld was tested according to Section IX of the ASME Boiler and Pressure Code and according to the Coast Guard Specification CG-7 and gave the results set forth in Table I.

ness was 2¾ inches, while edge preparation gave an angle A equal to 90° and a land dimension L equal to ¾ of an inch. The diameter of the type 5183 aluminum,

TABLE I

MECHANICAL PROPERTIES FOR EXAMPLE I

| Test Method | | UTS (KSI) | UYS (KSI) | Elongation (%) 2" | Elongation (%) 10" | Reduction of Area, % |
|---|---|---|---|---|---|---|
| Full Section Transverse Tensile | | 45.7 | 23.8(1) | 17.5 | 11.2 | — |
| Reduced Section Transverse | | 44.7 | — | — | — | — |
| ½" Diameter Reduced Section Tensile - All Weld Metal | | 41.3 | 20.0(2) | 29.0 | — | 42 |
| ½" Diameter Reduced Section Tensile - Parent Metal | (L) | 46.9 | 23.0(2) | 21.8 | — | 30 |
| | (LT) | 48.1 | 23.9(2) | 21.2 | — | 28 |
| Free Bend Test | | Elongation - 33.8% | | | | |
| Guided Bend Test (3⅛ (T) Radius) | | 180° Transverse Bend Produced No Cracks or Tears in Face, Root, or Side Bends | | | | |

Notes:
(1) 10" Gauge Length
(2) 2" Gauge Length
(L) Longitudinal direction, i.e. the direction in which the plate was rolled.
(LT) Long transverse direction
(T) Plate thickness

EXAMPLE II

Figure 6:
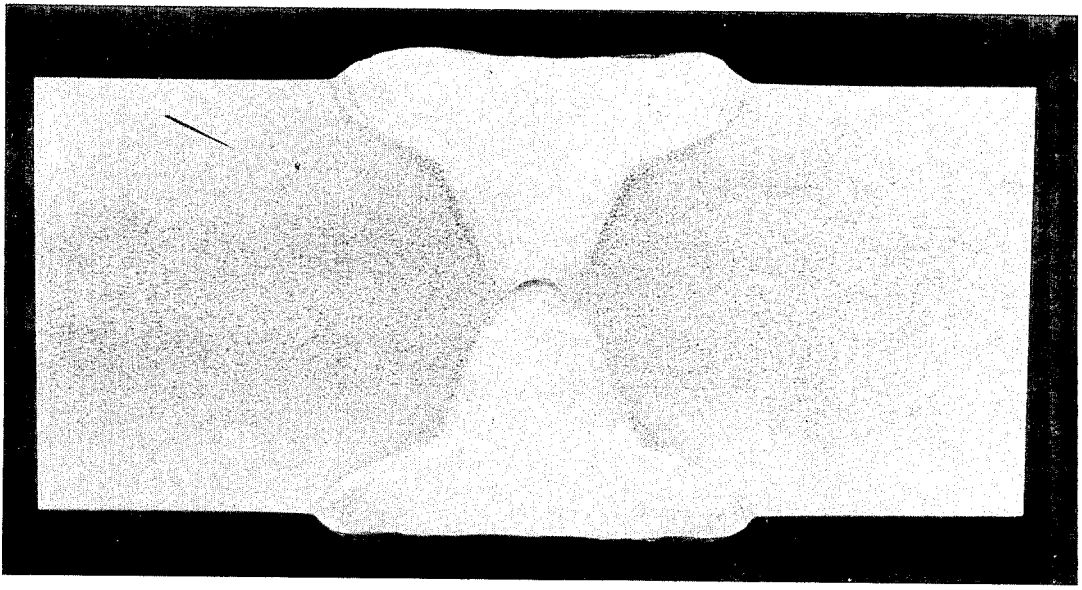
FIGS. 6 and 7 are photomacrographs of weld cross sections.
Figure 7:
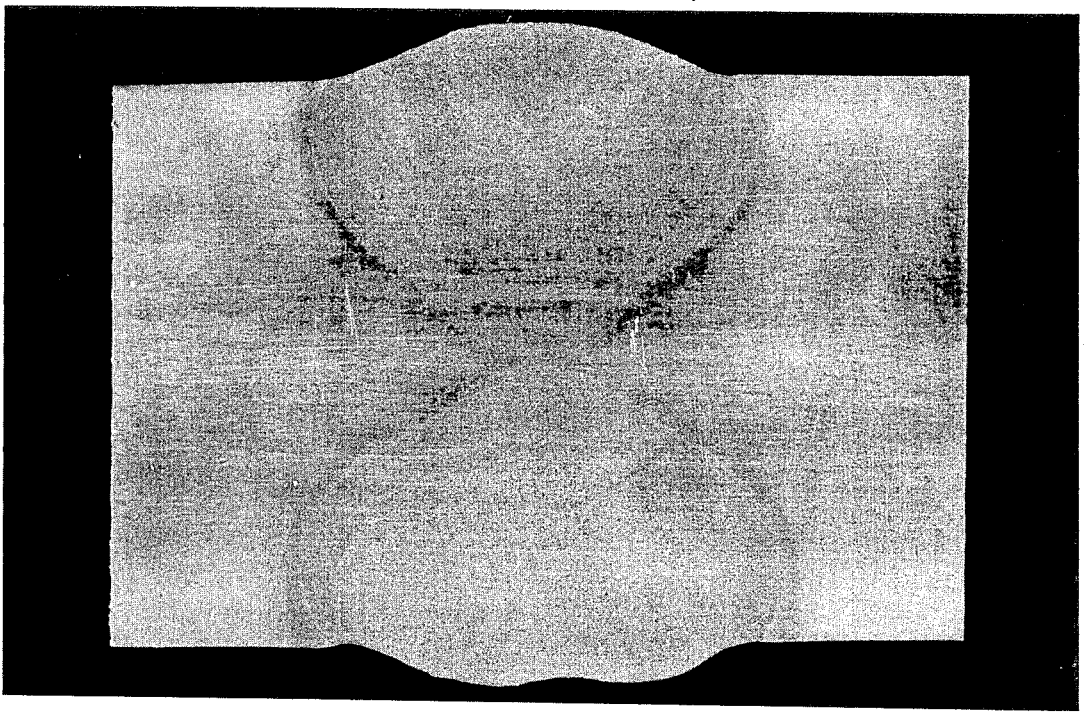

A weld was made in Example I, except for the differences set forth as follows. The consumable electrode had a diameter of ¼ inch and was of type 5183 aluminum, while power of characteristic as illustrated in FIG. 8a, i.e., 0 amperes/ volt slope, was supplied by a Diametrics Model 1741, Serial No. 0001, welding machine manufactured by the company as previously mentioned. For the face pass, the welding current was 800 amperes, the electrode moved toward the parent metal with a velocity of 60 inches per minute, the arc voltage was 32, and the speed with which the torch moved along the groove was 8 inches per minute. For the root pass, the welding current was 840 amperes, the electrode speed toward the parent metal was 65 inches per minute, the arc voltage was 32 volts, and the torch speed relative to the length of the groove was 8 inches per minute. Edge preparation differed in that a land dimension L of ¾ of an inch was used. The resulting mechanical properties are set forth in Table II, and a photomacrograph of the weld appears in FIG. 6.

consumable electrode was ¼ of an inch, and this was used in combination with the welding machine described in Example II, likewise set to give a characteristic of the type shown in FIG. 8a. Shielding gas flow through the cup 43 was 120 cubic feet per hour argon and 120 cubic feet per hour helium. Shielding gas flow through the trailing gas shield 53 was 150 cubic feet argon per hour. For the face pass, welding current was 800 amperes, electrode speed toward the parent metal was 62 inches per minute, arch voltage was at 32 volts, torch speed of travel along the groove was 4 inches per minute, and angle X was set at 12°. For the root pass, welding current was 840 amperes, electrode speed toward the parent metal was 65 inches per minute, arc voltage was at 32 volts, torch speed of travel along the groove was 4 inches per minute, and angle X was 12°. A photomacrograph of the resulting weld appears in FIG. 7.

In testing the weldments made with large diameter electrodes according to the present invention, data obtained indicates, as is clear from the above Examples I and II, that in all cases the guaranteed minimum prop-

TABLE II

MECHANICAL PROPERTIES FOR EXAMPLE II

| Test Method | | UTS (KSI) | UYS (KSI) | Elongation (%) 2" | Elongation (%) 10" | Reduction of Area, % |
|---|---|---|---|---|---|---|
| Full Section Transverse Tensile | | 44.2 | 23.6(1) | 15.8 | 10.2 | — |
| Reduced Section Transverse Tensile | | 43.8 | — | — | — | — |
| ½" Diameter Reduced Section Tensile - All Weld Metal | | 41.2 | 20.4(2) | 27.0 | — | 33 |
| ½" Diameter Reduced Section Tensile - Parent Metal | (L) | 46.5 | 23.4(2) | 22.3 | — | 29 |
| | (LT) | 47.4 | 24.2(2) | 22.5 | — | 38 |
| Free Bend Test | | Elongation - 39.9% | | | | |
| Guided Bend Test (3⅛ (T) Radius) | | 180° Transverse Bends Produced No Cracks or Tears in Face, Root, or Side Bends | | | | |

Notes:
(1) 10" Gauge Length
(2) 2" Gauge Length
(L) Longitudinal direction, i.e. the direction in which the plate was rolled
(LT) Long transverse direction
(T) Plate thickness

EXAMPLE III

A weld was made by the process described in Example I, except for the following differences. Plate thickness was 2¾ inches, while edge preparation gave an erty values specified for −0 temper 5083 plate are readily met. In addition, both radiographic and ultrasonic inspection disclose that the weldments obtained are free of detectable porosity or inclusions. The above Examples represent deposition rates ranging from 14 to 19 pounds per hour. Weld bead surface appearance, although more aesthetically appealing in some instances than in others, is structurally acceptable and does not require post-weld finishing. Distortion of the unrestrained 30-inch wide specimens in the above Examples in on instance exceeded ⅛ inch from the flat surface for the first pass. Upon completion of the second pass, distortion was normally reduced to less than 1/16 inch over the specimen surface.

In view of the increased deposition rates obtained (for example presently 14 to 19 pounds per hour), the broad latitude in joint preparation and the excellent mechanical properties that can be obtained, the present invention renders feasible the use of large diameter electrode MIG welding to reduce fabrication costs for structures or assemblies made of heavy aluminum plate.

The new welding process of the present invention has permitted consistent welding of thick aluminum plate, for example presently up to 2¾ inches in two passes. It provides a smooth, spatter-free, totally controllable, penetrating arc operating at currents of even 800 amperes or greater using ¼-inch diameter or larger electrode. Using a combination of improved welding torch, constant current power supply, and improved wire feed system, a spatter-free, totally controllable arc can be maintained which provides greater penetration and improved control of the weld puddle and results in a smooth weld bead surface.

Cost reductions can result from time saved in the various steps required to effect an acceptable joint. Typically, joint preparation regarding machining tolerances, fitup, joint surface finish and cleanliness will not be as critical as for conventional welding. The welding equipment and procedures utilized are relatively unsophisticated and do not require the services of highly skilled or trained personnel for proper use. Welds obtained with this process can be expected to be virtually free of porosity and inclusions and not display any lack of weld bead fusion. The size of the weld puddle and the time that it is maintained as a molten pool inherently prevent these faults from occurring. The elimination of these faults also effects a substantial reduction in weld repair costs normally encountered in multipass welding. The sum effect of the advantages gained in each of the described areas is a net reduction in welding time, problems and costs.

It will be understood that the above description of the present invention is susceptible to various modifications, changes, and adaptations and the same are intended to be comprehended within the meaning and range of equivalents of the appended claims.

What is claimed is:

1. A welding method comprising the steps of feeding a consumable electrode of at least ⅛-inch diameter at a constant speed toward a parent metal to be welded, while maintaining, with electrical power at an amperage-voltage characteristic having a slope of 0 to 2 amperes/volt, a direct current arc between the consumable electrode and parent metal, and while maintaining a shielding gas flow at the arc and on molten metal, wherein the electrical power is connected between the consumable electrode and the parent metal in reverse polarity, wherein the speed of the consumable electrode toward the parent metal to be welded is controlled to within plus or minus ½% of the desired speed, and wherein the power source providing the electrical power has a dynamic regulated output current of plus or minus 5%.

2. A welding method as claimed in claim 1, wherein the metal of the consumable electrode and the parent metal are both aluminum.

3. A welding method as claimed in claim 1, wherein the amperage-voltage characteristic has a slope of zero amperes/volt.

4. A welding method as claimed in claim 3, wherein a weld puddle is present and the parent metal is tilted to enable gravity to minimize arc contact with the weld puddle and to assure arc impingement on the parent metal.

5. A welding method as claimed in claim 4, wherein the electrical power regulation is to within plus or minus 1%.

6. A welding method as claimed in claim 1, wherein a weld puddle is present and the parent metal is tilted to enable gravity to minimize arc contact with the weld puddle and to assure arc impingement on the parent metal.

7. A welding method as claimed in claim 6, wherein the consumable electrode is fed from a welding torch having a forehand inclination angle.

8. A welding method as claimed in claim 6 wherein the electrical power regulation is to within plus or minus 1%.

9. A welding method as claimed in claim 1, wherein the parent metal is abutting, 2-inch thick plates of type 5083-0 aluminum, the consumable electrode is ⅛-inch diameter type 5183 aluminum moving toward the parent metal at 200 inches per minute, and the electrical power has a characteristic of 0 amperes/volt and is connected in reverse polarity with 590 amperes current flow.

10. A welding method as claimed in claim 1, wherein the parent metal is abutting, 2-inch thick plates of type 5083-0 aluminum, the consumable electrode is ¼-inch diameter type 5183 aluminum moving toward the parent metal at 60 inches per minute, and the electrical power has a characteristic of 0 amperes/volt and is connected in reverse polarity with 800 amperes current flow.

11. A welding method as claimed in claim 1, wherein the parent metal is abutting, 2¾-inch thick plates of type 5083-0 aluminum, the consumable electrode is ¼-inch diameter type 5183 aluminum moving toward the parent metal at 62 inches per minute, and the electrical power has a characteristic of 0 amperes/volt and is connected in reverse polarity with 800 amperes current flow.

* * * * *

UNITED STATES PATENT AND TRADEMARK OFFICE
CERTIFICATE OF CORRECTION

PATENT NO. : 3,944,781
DATED : March 16, 1976
INVENTOR(S) : John M. Urbanic and Burney A. Major It is certified that error appears in the above-identified patent and that said Letters Patent are hereby corrected as shown below:

| | |
|---|---|
| Abstract, line 13 | After "controlled" insert --to--. |
| Col. 3, line 5 | Change "of" to --or--. |
| Col. 3, line 7 | Change "RMSS" to --RMS--. |
| Col. 5, line 38 | After "torch" insert --end--. |
| Col. 9, line 7 | Change "on" to --no--. |

Signed and Sealed this eighteenth Day of May 1976

[SEAL]

Attest:

RUTH C. MASON
Attesting Officer

C. MARSHALL DANN
Commissioner of Patents and Trademarks